United States Patent
Blodgett

(10) Patent No.: US 12,431,036 B2
(45) Date of Patent: Sep. 30, 2025

(54) METHOD FOR LEARNING TO READ USING SPECIALIZED TEXT

(71) Applicant: Sarah K. Blodgett, Ledyard, CT (US)

(72) Inventor: Sarah K. Blodgett, Ledyard, CT (US)

( * ) Notice: Subject to any disclaimer, the term of this patent is extended or adjusted under 35 U.S.C. 154(b) by 0 days.

(21) Appl. No.: 18/501,273

(22) Filed: Nov. 3, 2023

(65) Prior Publication Data

US 2024/0071250 A1    Feb. 29, 2024

Related U.S. Application Data

(63) Continuation of application No. 15/640,019, filed on Jun. 30, 2017, now Pat. No. 11,935,422.

(60) Provisional application No. 62/357,648, filed on Jul. 1, 2016.

(51) Int. Cl.
  G09B 17/02    (2006.01)
  G09B 17/00    (2006.01)

(52) U.S. Cl.
  CPC ............. *G09B 17/02* (2013.01); *G09B 17/00* (2013.01)

(58) Field of Classification Search
  CPC ........... G09B 17/00; G09B 17/02; G09B 5/00
  See application file for complete search history.

(56) References Cited

U.S. PATENT DOCUMENTS

| | | |
|---|---|---|
| 4,655,713 A | 4/1987 | Weiss |
| 4,661,074 A | 4/1987 | Walker |
| 5,336,093 A | 8/1994 | Cox |
| 5,565,888 A | 10/1996 | Selker |
| 8,131,538 B2 | 3/2012 | Woodward |
| 8,543,914 B2 | 9/2013 | Klassen |
| D704,256 S | 5/2014 | Boer |
| 8,896,633 B2 | 11/2014 | Fino |
| 2004/0023191 A1 | 2/2004 | Brown et al. |
| 2007/0139412 A1 | 6/2007 | Stamm et al. |
| 2009/0132384 A1 | 5/2009 | Duncan et al. |
| 2010/0068682 A1 | 3/2010 | Su et al. |
| 2010/0068683 A1 | 3/2010 | Panec et al. |
| 2013/0253903 A1* | 9/2013 | Stephen ................. G09B 19/06 704/9 |
| 2013/0273511 A1 | 10/2013 | Terpstra et al. |

(Continued)

FOREIGN PATENT DOCUMENTS

WO    2005086118 A2    9/2005

OTHER PUBLICATIONS

Notice of Allowance dated Jan. 25, 2024 issued in U.S. Appl. No. 15/640,019.

(Continued)

*Primary Examiner* — Timothy A Musselman
(74) *Attorney, Agent, or Firm* — Blueshift IP; Robert Plotkin

(57) ABSTRACT

A method of providing an instructional scaffold to person learning to read English language comprises displaying printed matter to the learner in the form of lists. Preferably text stories. The normal spacing of the letters in words is kept intact; in a first part of the method the rime portions of monosyllable words are bolded and made larger than the onset portions; and in a second part of the method, which also may be used independently, the sequential syllables of multisyllable words are emphasized by alternating plain font with bolded font and the long vowels are identified, for example by underscore, again with the words of any text being kept intact.

8 Claims, 7 Drawing Sheets

(56) References Cited

U.S. PATENT DOCUMENTS

2015/0066501 A1* 3/2015 Thapliyal ............ G06F 16/5846
  704/235
2024/0127709 A1 4/2024 Blodgett

OTHER PUBLICATIONS

"Noah Text—Making Reading Accessible for All Individuals". Noah Text. Youtube video. Available at: https://www.youtube.com/watch?v=N9r_11rd8K0. Dated: Mar. 3, 2021.

Noah Text Releases Free, Easy-to-Use Tech Tool to Make Reading Easier for Dyslexic and Struggling Readers; https://www.24-7pressrelease.com/press-release/481622/noah-text-releases-free-easy-to-use-tech-tool-to-make reading-easier-for-dyslexic-and-struggling-readers; retrieved from WebArchive on Jan. 29, 2024 (dated Dec. 1, 2022).

StrongReader Works on Microsoft Edge; Browser Extensions created and tested internally at: https://chrome.google.com/webstore/detail/strongreader/fikpcalcdjahmldcgjmojdeokgoilcok and https://addons.mozilla. org/en-US/firefox/addon/strongreader/?utm_source=addons.mozilla.org&utm_medium=referral&utm_content=search;retrieved Jan. 9, 2024 (first published Feb. 2022).

Use our learning tools to help dyslexic and struggling readers; StrongReader Builder from Noah Text; https://app.noahtext.com/#/home; retrieved from WebArchive on Jan. 29, 2024 (dated Nov. 27, 2022).

Canadian Office Action—Examiner requisition dated Sep. 13, 2023 issued in CA3028225.
European Search Opinion dated Oct. 18, 2019; issued in EP17821406.
GB Examination Report dated Feb. 3, 2022 issued in GB1901141.0.
GB Examination Report dated Jul. 21, 2021 issued in GB1901141.0.
Final Office Action dated Feb. 1, 2023 issued in U.S. Appl. No. 15/640,019.
Final Office Action dated Jan. 22, 2020 issued in U.S. Appl. No. 15/640,019.
Final Office Action dated Sep. 9, 2021 issued in U.S. Appl. No. 15/640,019.
International Search Report dated Sep. 6, 2017 issued in PCT/US2017/040424.
Jordan Shapiro "Learning Tools for Microsoft One Note May be One of the Most Disruptive Education Technologies Yet"; Jan. 26, 2016; 5 pages; Forbes.com.
Miriam Cherkes-Julkowski, Ph.D.; "Read to Rime, Learn to Read"; (2005); pp. 1-7; Surviving Education Guides; Apache Junction, AZ.
Non-Final Office Action dated Apr. 26, 2022 issued in U.S. Appl. No. 15/640,019.
Non-Final Office Action dated Jun. 12, 2019 issued in U.S. Appl. No. 15/640,019.
Non-Final Office Action dated Oct. 1, 2020 issued in U.S. Appl. No. 15/640,019.
Notice of Allowance dated Oct. 4, 2023 issued in U.S. Appl. No. 15/640,019.
Australian Patent Examination Report No. 1 mailed Jun. 21, 2022 in AU2017286966.

* cited by examiner

| Sample of typical First Grade Words: | Sample words with rime and long vowel stressed |
|---|---|
| big | big 106  108<br>pig<br>dig 106  108<br>rig |
| 104 | 106  108 |
| day | day 106  108<br>may<br>say 110<br>way |
| could | 112 could<br>would<br>should |
| 104 | |
| know | know<br>blow 110<br>grow |
| look | look<br>book<br>took<br>cook |

*FIG. 2*

Frank is a small boy with blond hair and big blue eyes. He lives in a big old house with his mom and dad by his side. Though, the house does not feel old. Frank's mom and dad fixed the house up with paint, wood, and nails.

*FIG. 5*

Frank is a small boy with blond hair and big blue eyes. He lives in a big old house with his mom and dad by his side. Though, the house does not feel old. Frank's mom and dad fixed the house up with paint, wood, and nails.

*FIG. 6*

| Sample Multisyllable Words | Sample words having identifiers for syllables and long vowels. |
|---|---|
| nation | nation |
| national | national |
| excited | excited |
| exited | exited |
| musical | musical |
| mustard | mustard |
| major | major |
| majority | majority |
| diagnosis | diagnosis |
| divide | divide |
| beautiful | beautiful |
| believable | believable |
| signing | signing |
| signature | signature |

Franklin Noah Peterson lives in a small
New England coastal town called Port
Jonah. Frank, as he is called by friends
and family, is twelve years old. He has
wavy blond hair and big blue eyes. He is
of average build for his age. Some would
say he's a little quirky. He loves
animals and all things nature affords.
He loves to build crazy structures in his
backyard, especially for his backyard
chickens, to which he has ascribed
various names.

Franklin Noah Peterson lives in a small
New England coastal town called Port
Jonah. Frank, as he is called by friends
and family, is twelve years old. He has
wavy blond hair and big blue eyes. He is
of average build for his age. Some would
say he's a little quirky. He loves
animals and all things nature affords.
He loves to build crazy structures in his
backyard, especially for his backyard
chickens, to which he has ascribed
various names.

Franklin Noah Peterson lives in a small New England coastal town called Port Jonah. Frank, as he is called by friends and family, is twelve years old. He has wavy blond hair and big blue eyes. He is of average build for his age. Some would say he's a little quirky. He loves animals and all things nature affords. He loves to build crazy structures in his backyard, especially for his backyard chickens, to which he has ascribed various names.

Franklin Noah Peterson lives in a small New England coastal town called Port Jonah. Frank, as he is called by friends and family, is twelve years old. He has wavy blond hair and big blue eyes. He is of average build for his age. Some would say he's a little quirky. He loves animals and all things nature affords. He loves to build crazy structures in his backyard, especially for his backyard chickens, to which he has ascribed various names.

*FIG. 11*

METHOD FOR LEARNING TO READ USING SPECIALIZED TEXT

CROSS-REFERENCE TO RELATED APPLICATIONS

This Continuation application is based on and claims priority to U.S. Nonprovisional patent application Ser. No. 15/640,019, filed on Jun. 30, 2017 (hereinafter referred to as the "'019 application"), in the U.S. Patent & Trademark Office, and U.S. Provisional Patent Application No. 62/357,648 filed Jul. 1, 2016 hereinafter referred to as the "'648 application"). The '019 application is based on and claims priority to the '648 application, and the entire disclosure of the '019 application and the '648 application are incorporated herein by reference in their entireties.

TECHNICAL FIELD

The present invention relates to a system and method for helping persons how to read written language, particularly including aiding young persons with learning disabilities to read English more easily and quickly.

BACKGROUND OF THE INVENTION

People with learning disabilities, such as dyslexia, often struggle with learning how to read. In particular, certain children and some adults have cognitive abnormality (as distinguished from intelligence abnormality) in the brain neuroanatomy and functionality that are associated with language processing. They manifest inadequate working memory and phonemic awareness. And it is difficult for them to pay attention during the laborious process of learning how to read. Even when they succeed, they often have low fluency. People having learning problems can include those who have had physical/neurological illness with a result being a language disability, necessitating re-learning. Cross linguistic studies have shown that for normal learners it takes two to three times more instruction time and practice to learn to read the English language than that which is required by most other languages. That can be a disadvantage to an English language-based nation in that it impedes expeditious and efficient education of students. Some studies have indicated that as a result the United States educationally lags behind non-English language nations.

Compared to many other languages, the written English language has a very irregular orthography—i.e., that part of written language that deals with letters and spelling. In this application "English language" refers to an essential language comprised of Latin-derived letters, variations of which are manifested in countries such as the United States, United Kingdom, Canada, Australia, New Zealand, South Africa, Nigeria and other present day countries which were formerly colonies of Great Britain.

The irregular orthography of the English language makes learning to read the language difficult for a many learners. In particular, there is poor correspondence between graphemes (written symbols) and phonemes (spoken sounds) of the language. The learner reader who has a problem finds it particularly difficult to identify the most critical information or patterns within the English language writing system. That puts a greater burden on the working memory of the learner and thereby decreases the ability to acquire a phonological awareness and fluency. The result is often that the learner has sub-par fluency, learning speed and ultimate reading capacity. A learner of English language might be a young person in an English speaking household who has a learning disability, or might be a person seeking to learn English as a second language, or might be a person who has suffered a brain injury and needs to re-learn reading.

In the familiar human experience children are first taught individual sounds and oral language; they are then taught written language and the association of the sounds and oral language with such.

The patent literature manifests a number of techniques which have sought to aid those learning to read, particularly those with difficulties. In some of the methods, the learner is required to learn a set of unconventional graphic symbols that are superposed above the words of text. Reference may be made to the following U.S. Pat. No. 4,007,548 Cytanovich; U.S. Pat. No. 6,604,947 Rai; U.S. Pat. No. 5,336,093 Cox; U.S. Pat. No. 4,655,713 Weiss. See also U.S. Pat. Publication 2004/0178044 of Carter et al., and International Publication WO 2005/086118 of Oquist. See also U.S. Pat. No. 8,131,538 of Woodward which has an extensive description of features of English which make learning the language difficult, defines language-related terminology, and describes approaches taken to improve learning to read. It appears that the methodologies described in the patents either have met uneven success or, for whatever reason, have failed yet to be widely adopted to the exclusion of alternative approaches.

The general learning capability of some adults and children is facilitated by what is called "instructional scaffolding" or alternatively "scaffolded instruction." In such an approach the teacher breaks the subject matter into "chunks" (identifiable portions of subject matter), and there is a tool or structure associated with each chunk. Different types of instructional scaffolds may be used. For example, visual aids such as cue cards may be used to learn a language. If instructional scaffolding can be effectively applied to language learning, learners may find less burdensome the acquiring of a capacity to read well.

In the U.S. today, young students are commonly exposed to a blend of two main methods of reading instruction, commonly referred to as "whole language" and "phonics". Whole language emphasizes meaningful reading experiences by exposing the student to rich text literature. The student is required to memorize high frequency words and is drawn to picture clues in order to read text. Phonics instruction focuses on letter-sound correspondence and spelling patterns to aid the student. Ideally, this is done in an explicit and systematic manner and emphasizes phonemic awareness.

SUMMARY

An object of the invention is to provide a methodology and system for imparting reading skills to persons who have learning difficulties or for whom English is a second language. A further object of the invention is to provide a way of displaying English language words and text in a way that simulates predictable orthographies that are present in certain other languages, while keeping the current irregular orthographies of the English language intact. A still further object is to provide a method which helps reading while being compatible with the whole language and phonics methods mentioned in the background.

In the method and system of the present invention, there is provided a serial "instructional scaffolding", upon removal of which the successful learner will have gained reading skill. The invention comprises use of lists of words and text which are especially composed for teaching effect and selected words are modified in appearance.

In embodiments of the present invention, for teaching a beginner person how to read, the learner is displayed printed matter which is comprised of monosyllable words which are intact (by having conventional letter-to-letter spacing), and the letters of the rime portion of words are emphasized by being more visually intense—as by being bolded letters, optionally also with larger font. The onset portion of the word has letters in plain font. In combination with that step, the long vowels are delineated, as by underscoring or another identifier.

In a further part of the method embodiment, which may be used after the foregoing first part, or which may be used independently, the learner is displayed printed matter comprised of a combination of monosyllable words and multisyllable words. The monosyllable words are presented in plain text while the multisyllable words are written using two different fonts of typeface, the fonts alternating with each other from one syllable to the next syllable within the word. In addition, the long vowels including those with schwa sound are differentiated from non-long vowels. Different fonts include those which are bolded or colored or have otherwise significantly different visual impact. All the words in a text are intact with no separation or other demarcation of syllables, for the purpose of oriented the learner toward text of the kind which is encountered outside the learning environment.

The nature of the printed matter may vary: more preferably the matter comprises text in story form, alternatively lists or other presentations. The printed matter may be displayed on different media, including in books, as lists or cards, and on electro-optical displays. The printed matter embodying the invention methodology is most preferably a text comprised of sentences, communicating a fiction or non-fiction story or narrative, with or without pictures. Carrying out the invention in such a way imparts context to the words as they are emphasized and modified, and imparts fluency in reading.

In the present invention, the foregoing instructional scaffolding comprised of displayed printed word lists or texts is used to support the learner until a task is mastered. Then the scaffold is gradually removed. In the invention the current irregular orthography of English language is maintained in that words are kept intact since there is no change in letter spacing. Yet, by simulating predictable orthographies, the invention alleviates the burden English orthography places on a learner's working memory and shortens the instructional time needed to obtain reading fluency and improved reading speed.

The present invention complements the current familiar methods used in U.S. classrooms today, as mentioned in the Background. At the same time, the invention highlights critical patterns in the words of the text that the phonics method embraces to help the child decode and thus read with fluency and ease. The invention builds reading skill while students are reading text, thus bringing predictability to the numerous words students are otherwise required to memorize.

The foregoing and other objects, features and advantages of the present invention will become more apparent from the following description of preferred embodiments and accompanying drawings.

BRIEF DESCRIPTION OF THE DRAWINGS

FIG. 2 is a sample set of first grade monosyllabic words along with an expanded set of such words with rime emphasized and long vowels identified.

FIG. 5 is the sample paragraph of FIG. 3, with long vowels identified.

FIG. 6 is the sample paragraph of FIG. 3 having monosyllabic words with both rime emphasized and long vowels identified.

FIG. 7 is a sample set of multisyllabic words and a corresponding set of those words with syllables and long vowels identified.

FIG. 8 is the sample paragraph with multisyllabic and monosyllabic words, in plain text.

FIG. 9 is the sample paragraph of FIG. 8 with only syllables identified.

FIG. 10 is the sample paragraph of FIG. 8 with only the long vowels identified.

FIG. 11 is the sample paragraph of FIG. 8 with both syllables and long vowels identified.

DESCRIPTION

Embodiments of the present invention employ a typography in which individual words are "intact", by which is meant that the spacing between letters of a word is in accord with standard typography which is most familiar to ordinary literate readers of text printed in paper books and displayed otherwise for reading. (Hyphenation is avoided, but a small amount may be present within what is intact word text.) An intact word has no significant variation of letter spacing beyond that associated with the particular typography, i.e., there are no separations aimed at aiding a reader to understand or pronounce a word. In some embodiments here, each letter occupies an adjacent same-size space, as characterizes Courier New typeface. Typeface refers to a family of fonts composed of letters (glyphs) that share common design features. Typography refers to the style, arrangement, or appearance of alphabetic matter. In some embodiments, the typeface may be characterized by kerning, as characterizes Times New Roman typeface, where the width of space occupied by a letter varies according to the width dimension of the letter.

As described by example below, displays of printing within the scope of invention employ a typography which comprises predominately lower case letters. Only the initial letters of sentences and initial letters of proper names, etc. are capitalized. Preferably, the lettering is upright and has serifs. Lettering is preferably printed in dark color, more preferably black, on a white or light color background.

Text as used herein refers to a set of words that are organized to communicate information, typically in the form of sentences. Text may or may not be left- and right-justified. Text may be displayed to a learner on a choice of medium, including printed paper, electronic display screen, virtual reality, etc. Some embodiments of the invention comprise lists of words in column or tabular form on a sheet or optionally on a playing card or flash card or electro-optical display or any other medium used to communicate visual information to a person.

In an aspect of the invention, portions of words in a text are modified to differentiate the portions from each other, to aid those learners who have reading difficulty. The differentiation may comprise use of a means for emphasis which draws a reader's eye to one or more portions of a word by clear differentiation of a portion from plain text. Examples include boldface, font size and an identifier (such as underscore).

Figure 1:
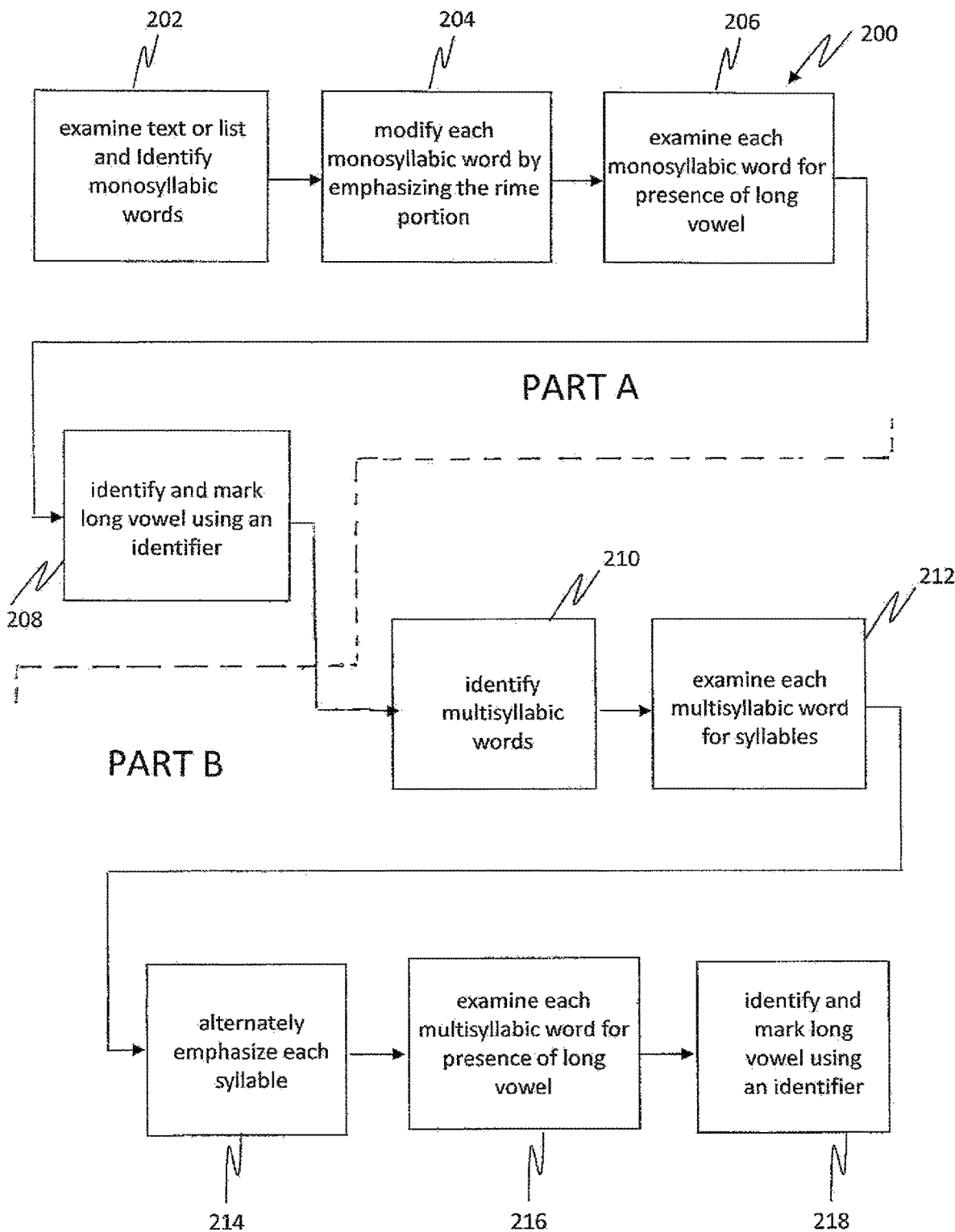
FIG. 1 is an operational block diagram illustrating a method for teaching people with learning difficulties how to read.

FIG. 1 is an operational block diagram that illustrates essential portions of an embodiment 200 of a multi-step method of the present invention, which is divided into Part A and Part B.

Embodiments of the invention may be manifested as a system comprising plurality of lists on separate sheets or pages. More preferably a system comprises one or more text documents which communicate fiction or non-fiction stories that may or may not be related to each other. Presenting the learner with an interesting story is a way of generating and holding the person's interest in learning to read. Printed books of the invention system comprehend traditional paper book/booklet form, e-book form, and displays on the screen of an electronic device that are created by software. Examples of printed paper books in accord with the present invention, bearing the NoahText® brand name, may be found at the website www.noahtext.com.

The next part of this description discusses the parts of the method and their relationship with lesser detail. In following sections, more detail is provided, first for Part A and then for Part B.

In steps 202 through 208 of method Part A, a learner is first displayed printed matter text comprised of monosyllable words. (A syllable is a unit of spoken language that consists of a single uninterrupted sound formed by a vowel and one or more consonants.) An exemplary first display consists of text comprising typography wherein the rime portion of a word is emphasized, as by being in bolded font, while the onset portion of the word is in plain font. The linguistic term "rime" refers to letters starting with the vowel which follows the onset, and running to the end of the syllable. The linguistic term "onset" refers to the initial consonant portion of a syllable. In addition, in the invention, those vowels which are long vowels may be graphically distinguished from other vowels (short vowels) that are within another monosyllabic word. In the invention, the way in which the rime portion of a word is emphasized is unique, in that there is no significant separation between the letters compared to that of standard typography, i.e., the word remains intact.

An objective of Part A of the method 200 is to bring predictability to the numerous common words a learning reader is otherwise required to memorize. The emphasized rime enables learners to articulate words appropriately from the beginning, rather than stumbling through, sounding out words left to right, which often necessitates self-correction.

When the learner is focused first on rime, it inhibits giving a sound outside the rime to the other letters of the word. For example,-ou could be -out in shout,-ough in cough,-ould in would, or -ought in thought. Even a simple word like cat necessitate self-correction as the new learner over extends letter sounds, i.e., cuh-a-tuh. There is a difference when a person articulates "c" in cat, compared to the "c" in cut. The sound comes from a different area of the mouth. If the learner is oriented to the rime first, the learner recognizes the -at in cat and the -ould would, eliminating the need to self-correct, enhancing fluency and speed.

Acquiring a rime-based skill enables a learner subsequently to recognize multisyllable words having within them similar rimes to those which were learned. Orienting to the rime also lessens the burden on the learner's working memory, which is often already overstrained in new and struggling readers. Orienting a learner to the rime portion is the basis for fluency in decoding written text. To decode text means to translate a written word into spoken sound and meaning.

A reference describing the technique of improving reading skills by focusing on rime is "Find the Vawol, Read the Rime, Learn to Read" by M. Cherkes-Julkowski, Surviving Education Guides, Apache Junction, Ariz. (2005).

In embodiments of the present invention, the known Cherkes-Julkowski technique of having a learner orient to rime in monosyllabic words in Part A is combined with the methodology of Part B of method 200, where multisyllabic words are modified.

Multisyllable words have a complex syllable structure due to the complexity of English orthography. As mentioned, Part A seeks to teach the learner to orient to the rime portions of words. That skill positions the learner to decode multisyllable words. It does that because, from an orthographic standpoint, the rime can be viewed as essentially a syllable within a syllable. For example, the rimes -ate in rate, -ight in light, and -ind in mind that are present in single syllable words are present in the multisyllable words such as tolerate, hindsight, and behind. The learner, having acquired knowledge of some regularities and patterns from work with single syllable words, is now positioned better to decode and sound out multisyllable words.

In one aspect, when used with Part A, the method of Part B of the method builds on the skills learned in Part A. Notwithstanding, a reader may have other prior learning, and may alternatively use Part B without first using Part A.

In a nutshell, in Part B the syllables are emphasized without introducing added inter-letter separation (i.e., the words are kept intact). And the long vowels are emphasized. In Part B, comprising steps 210 through 218, a learner is displayed additional printed matter in list or text form, which is comprised of a number of multisyllable words. In one embodiment of the invention, the syllables of multisyllable words are visually differentiated by preferred emphasis means from each other while the monosyllable words are presented in plain text.

In steps 214 to 218 the long vowels are identified, as by an underscore, to differentiate them from non-long vowels which remain unidentified, additionally. Although it may not often be needed because of progress of the learner, in a variation of the method 200 the monosyllable words that are present also may optionally displayed as they were in steps 202 through 208, to emphasize the rime portion.

When a learner is successful in showing improved reading ability by using method 200, the specialized text presentation may be removed gradually or entirely, and the reader can be displayed plain text, familiar to non-learners. As example of partial scaffold removal: if the reader continues to have difficulty with a particular aspect of reading such as vowels, further text with only vowels emphasized may continue to be used.

In carrying out the modification, the preponderance of the words in a text or list is modified. The method is effective even if every one of the monosyllable or multisyllable words is not appropriately modified and all the long and long-with-schwa vowels are not identified. A lot of work can be involved in modifying an existing list or text, or in creating new subject matter. Because of the complex structure of English language and its dialects, substantial word research has been found necessary to try to make modified text as correct and effective as possible.

The next part of this description gives more detail about Part A of method 200.

Figure 3:
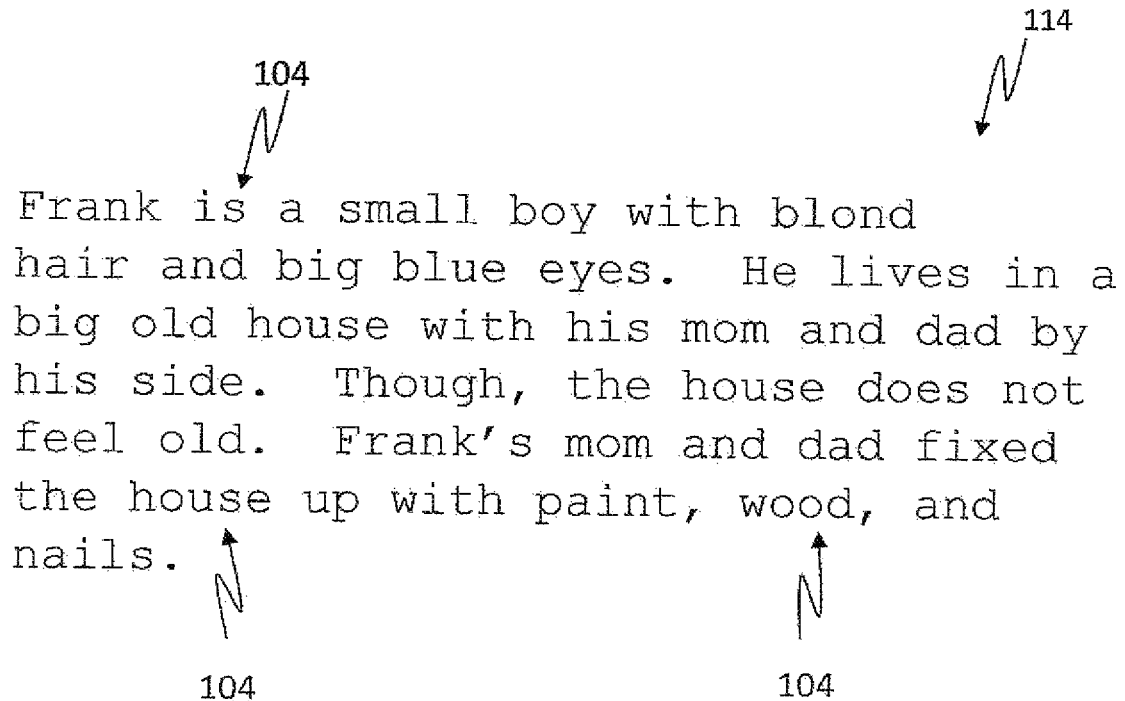
FIG. 3 is the sample paragraph with monosyllabic words, in plain text.

Referring to FIG. 1 and FIG. 2, method 200 includes composing a text comprised of monosyllabic words 104. Examples of monosyllabic words are shown in FIG. 2. FIG. 3 is a sample paragraph of text 114 comprised on monosyllabic words in plain font, e.g., a typeface that has consistent design and size from letter to letter, such as the typefaces commonly known as Courier New, New Times Roman, Calibri, etc. Paragraph 114 is written in Courier New.

A paragraph such as sample paragraph 114 may have been first written by an author in plain font, and then operated on, or modified, in accord with the method steps of the invention, to provide text that is then displayed to the learner. Alternately, the author may carry out the method in the process of creating original text.

In an embodiment of the invention, plain font text is modified and displayed to aid the learner so that selected portions of words are in not-plain or not-standard font, to emphasize those selected portions to the learner. The author or an editor (the creator, hereafter), finds in the plain text most if not all of the monosyllabic words 104 using creator's knowledge or using reference works. (The creator may be computer program software embodying artificial intelligence.) After analyzing each word, the creator divides the word into a second portion 108 (the rime) by adding emphasis to the rime portion, thus leaving first portion 106 (the onset) in the original font or another less emphasized state. The aim is to have the learner first look at the rime portion, and then on the onset portion. Thus for example, the onset portion would not be bolded or otherwise emphasized to make it non-standard in a way which draws the reader's eye. Articles and certain pronouns may be omitted in this and other steps.

In this aspect of the invention, there is no change in letter spacing and no addition of markings to make the rime portion different from plain writing, so as to achieve the objective of enabling decoding, fluency, obtaining good reading speed. That compares to various other prior art techniques which only tend to aid de-coding, such as when syllables are spaced apart or when symbols (reflecting another code) are superimposed on words. It is thought that such techniques impede fluency and enhanced reading speed.

Figure 4:
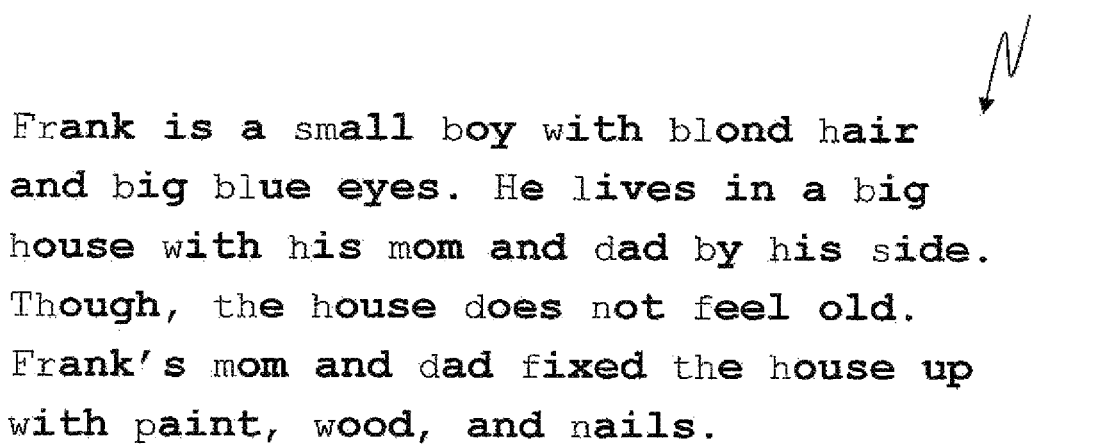
FIG. 4 is the sample paragraph of FIG. 3, with rimes emphasized.

In the example of FIGS. 2 to 4, the letters of the onset, first portion 106, of each word 104 have regular font, while the rime, second portion 108 of each word has bolded font. "Bolded" or "bold" means that the letter has more weight, i.e., the elements of the letter are thicker and appears darker than do comparative non-bolded letters. The degree of bolding should be of weight or intensity sufficient to command the attention of a learner looking at the word. For further emphasis, the points of the typeface of second rime portion letters may be made increased from the points of the first portion, so the letters are larger in size. "Points" refers the size of the space occupied by the greater vertical extension letters, commonly in units of 1/12th of an inch (about 0.2 mm).

In FIG. 2 a sample set of typical first grade grammar school monosyllabic words 104 is shown in the first (left) column in plain font. The exemplary words are "big," "day," "could," "know" and "look." In the second (right) column each of the words 104 is divided into the first portion (onset) 106 and second portion (rime) 108, emphasized by the boldface font which is also somewhat larger than the plain font. In addition, other words having the same rime as one of the words 104 are written below each word from the first column with the rime portion emphasized by boldface, i.e., "ig," "ay," "ould," "ow" and "ook," respectively. The onset portion 106 of each word, i.e., "b," "d," "c," "kn" and "l," respectively, is in plain font.

In addition, each word in the second column has the vowel underscored, when the vowel is a long vowel. Thus, for example, "a" in "day" the same-sound rime letters are boldfaced and increased in point size. This is discussed further below.

Continuing with respect to rime emphasizing: FIG. 4 shows paragraph 114A, which is paragraph 114 of FIG. 3 after modifying to carry out the method of ascertaining the rime in each word 104 and distinguishing the rime from the onset by a combination of boldfacing and font size increase in accord with steps 202-204.

In FIGS. 2, 4 and 6, the plain font is Courier New lower case letters having a font size 20 points (preferably with the initial capital letter of any word having a font size of 22 points). In comparison, the rime portions 108 have boldface Courier New with font size 24. In another example, not shown, the onset lower case letters may be in regular font which is Times New Roman having font size 12 points and the rime may be Times New Roman font size 14. While it is preferable from a readability standpoint to have glyphs which are consistent, i.e., all Courier New or all New Times Roman, in still another example, regular text may be Times New Roman, Font size 12/14 and the rimes may be Courier New Font size 12/14.

As shown by operational block 206, each word 104 is further examined by the creator for the presence of a long vowel 110. When found, the long vowel 110 is emphasized with an identifier 112 as indicated by operational block 208 and FIG. 2. An identifier is a marking associated with a letter. An exemplary identifier is an underscore.

FIG. 5 shows paragraph 114B, which is the text paragraph of FIG. 3 after it has been modified to identify the long vowels by underscoring, as a result of carrying out steps 206-208. To help the reader more with articulation, long vowels which are pronounced with a schwa sound (i.e., commonly, without accent) are also identified. Examples of words with vowels having schwa sound, with an identifier and syllable emphasis added, are: remark, pronounce, and proficient.

FIG. 6 shows paragraph 114C, which is the text paragraph of FIG. 3 after it has been modified so the rime portions are bolded and the long vowels including those that have schwa have been identified by underscoring, as a result of carrying out the steps 202-208.

The portion of method 200 that was just described advantageously allows a learner to appreciate quickly the rime portion and differentiate it from the onset portion, and to know whether the vowel in the word is long, by default, whether it is short. The rime portion is emphasized so it attracts the learner-reader's first attention.

With respect to emphasizing letters in monosyllabic text or multisyllabic text (as described in the next portion of this description), bolding of letters is a preferred way of emphasizing letters. Bolding insubstantially changes the overall letter shape. Bolding avoids adding another kind of a mark or symbol above or below the rime letters because such features tend to draw the eye away undesirably from the letters themselves.

Other modes of emphasis for the rime letters may be used in carrying out the invention, provide the rime portion will be characterized by letters which "catch the eye" of the reader, compared to the letters which characterize the onset portion. In this description, such rime letters are said to be more intense. Being more intense is a characteristic of rime letters which are bolded, when onset is in plain font. Other ways of achieving the heightened intensity may be employed. In an example, the onset is in black font while the rime is in a bright color font such as red or orange. In another example, the onset and rime have the same hue, but the rime is either one or more of significantly greater chroma or significantly lesser value, in the colorimetry of the Munsell color system. In another example, the rime is in plain font and the onset is fainter, as is a halftone. In another example, the typeface of the rime portion is more graphically commanding than is the different typeface of the onset portion. Different combinations of the foregoing may be employed. In each example, bolding and greater points may also be applied to the letters of the rime.

It is found that with repeated exposure and learning to the modified monosyllabic-heavy text of FIGS. 4 to 6, many learners are enabled to decode monosyllabic word text more readily. As now will be detailed, the reading ability that is as a result acquired is helpful with multisyllabic words.

The next part of this description gives more detail about Part B of method 200.

Part B of method 200, steps 210 to 218, helps the learner to recognize and learn words having multiple syllables. In a list or text, each of a plurality of the multisyllabic words 116 is ascertained, as shown by operational block 210; each word is examined to find the syllables 118, as shown by operational block 212. With reference to FIG. 7 each of the syllables 118 are then differentiated from adjacent syllables, as indicated by operational block 214 so the syllables 118 may be quickly recognized by the learner.

Referring to FIG. 7, a sample set 120 of multisyllabic words 116 of the kind that seem tricky to many kinds of poor readers is shown in plain font in the left column. In the second (right side) column, each word 116 is set forth with emphasis on syllables 118, but a way which does not separate the letters of the word any more than in standard intact word text. In the example, bolding of the type is used. Optionally some change in points may also be employed. The method of differentiating syllables avoids such as use of inter-syllable bullets (dots), substitutional accent marks, and associated spacing between letters that dictionaries and other teaching publications use. Reading speed is impaired when letters or letter-sets of a word are separated (as by dots or spaces), and the invention overcomes that limitation.

For example, referring to the sample set 120, the word 104 "national" has three syllables, a first syllable 218, a second syllable 318 and a third syllable 418. In the modification of the words, the sequential syllables are indicated by alternately emphasizing and not emphasizing each syllable. Thus the first and third syllables ("na" and "tion") are bolded and the middle syllable is not. As another example, the word "musical" has the first syllable 122 "mu" bolded; the third syllable 126 "cal" bolded, and contiguous/intervening second syllable 124 "si" is in plain font.

Additionally, as with monosyllabic words, each multisyllabic word 116 may be further examined for the presence of the long vowel 110, as shown by operational block 216 and the list of FIG. 7. When a long vowel 110 is present, it is associated with a long vowel identifier 112, for example, an underscore in accord with operational block 218. Other identifiers may be used for long vowels including those long vowels with schwa. For example, other identifiers include a line above the vowel (i.e., over-score); one or more dots or other accent symbols below or above the vowel.

FIG. 8 shows sample text paragraph 128 in plain font. The text 128 may be referred to as "higher level text", in comparison to the text of FIG. 3 and paragraph 114, because of the presence of both monosyllabic and multisyllabic words and more complex grammar and sentence structure.

The text paragraph 128A in FIG. 9 displays how the text of FIG. 8 appears after it has been modified by carrying out steps 210-214 to emphasize the syllables.

The text paragraph 128B in FIG. 10 displays how the text of FIG. 8 appears after it has been modified by carrying out steps 216-218 to emphasize the long vowels including those with schwa.

The text paragraph 128C in FIG. 11 displays how the text of FIG. 8 appears after it has been modified by carrying out all the steps 210-218 to emphasize both the syllables and long vowels including those with schwa.

As mentioned above, while ordinarily the progress of the learner will not indicate a need, an option is further to modify text like paragraph 128C so that the monosyllable words that are present are displayed as they were when the text comprised predominately monosyllabic words, as in paragraph 114A.

With multisyllabic words an object is to impart to the syllables significant differentiation, from one letter set (syllable) to the next, sufficient for the normal human eye to easily perceive the difference. It is not necessary that one particular syllable "catch the eye" more than another syllable in the same word, as compared to the approach for rime/onset. Black typeface is preferred because most commonly documents are displayed in such fashion, and thus the desired differentiation is achieved by an intensity difference which is preferably bolding and not-bolding.

Other ways of achieving differentiation amongst syllables may be employed. In an example, syllables alternate from black font to color font; or syllables in color change significantly in chroma or value. (Avoiding bolding, and for example changing color, may be preferred in order to avoid changing the typography (i.e., the total length of a string of paragraph text) of an extant document being modified to carry out the invention—such as where there are also Figures related to the text.) In another, the syllables alternate between plain font and font which is fainter, as is a halftone. In another example, the typefaces are substantially different. All the foregoing are considered to entail use of different fonts, within the claims of the present invention. Different combinations of the foregoing may be employed. Some of the foregoing exemplary modes may be more effective than others, with respect to preparing a learner to read text in conventional typography that will be encountered outside the learning environment.

The second portion of method 200 that was just described advantageously allows a learner quickly to mentally sound multisyllable words and to understand whether or not the vowel in the word is long or short. Because the preferred emphasis (alternating bold and plain sets of letters) do not space apart the syllables of word, the learner is more attuned to anticipating and reading other commonplace texts he or she will encounter in future daily life. It is found that with repeated exposure and learning to the modified text many learners become more capable of decoding both monosyllabic and multisyllabic words, similar to what readers would be able to do if the English language had a consistent and therefore predictable orthography.

Depending on the amount of learning disability of the learner and the progression of the learner's overcoming of such, using the method and system of the present invention may be carried out in modified form with time, i.e., the scaffolding that comprises the method/system may be gradually removed. For example, there may be only highlighting of those portions of words with which the learner has trouble. So, if the learner is not having problems with the vowels, then only the rime/onset pairs might be highlighted, or vice versa. When a learner has advanced sufficiently in reading capacity, text without any modification be displayed for reading, along the lines of the text shown in FIG. 3 or FIG. 8, depending on the level of achievement of the learner.

While the invention has been described in terms of English language, to the extent other languages present some of the same kind of orthographic difficulties to the learner, the method may be utilized with those other languages.

While the invention has been described with reference to an exemplary embodiment, it will be understood by those skilled in the art that various changes, omissions and/or additions may be made and equivalents may be substituted for elements thereof without departing from the spirit and scope of the invention. The claimed invention shall not be limited to a particular embodiment disclosed herein. Elements of one embodiment may be combined with elements of other embodiments. Any use of words such as "preferred" and variations suggest a feature or combination which is desirable but which is not necessarily mandatory. Thus embodiments lacking any such preferred feature or combination may be within the scope of the claims which follow.

The invention claimed is:

1. An electronic device comprising:
a computer including software configured to cause the computer to:
ascertain a plurality of orthographic multisyllable words in a text;
analyze and divide at least one orthographic multisyllable word of the plurality of orthographic multisyllable words into two or more syllables by examining the at least one orthographic multisyllable word;
cause an electronic display to display a screen created by the software, the screen including a modified version of the text that adds emphasis to a first syllable of the two or more syllables by using an emphasized font, while leaving a second syllable of the two or more syllables in an original non-emphasized font, wherein spacing between letters of the plurality of orthographic multisyllable words in the modified version is in accord with a standard typography, wherein the two or more syllables in the at least one orthographic multisyllable word include sequential syllables of the at least one orthographic multisyllable word, the sequential syllables being emphasized by alternating plain font with bolded font; and
graphically distinguish, in the modified version of the text, an orthographic long vowel from an orthographic short vowel.

2. The electronic device of claim 1, wherein the graphically distinguishing the orthographic long vowel from the orthographic short vowel includes underscoring the orthographic long vowel, while not underscoring the orthographic short vowel.

3. The electronic device of claim 2, wherein the emphasized font is a bolded font, and the original non-emphasized font is not bolded.

4. The electronic device of claim 1, wherein the orthographic multisyllable words of the modified version and the orthographic multisyllable words of the text correspond to words of a Latin-derived language and/or an English-derived language, and wherein the emphasized font is bolded and is a first font theme and the original non-emphasized font is not bolded and is a second font theme that is different than the first font theme.

5. A computerized method implemented by a computer, the computerized method comprising:
ascertaining, by using software of a computer, a plurality of orthographic multisyllable words in a text;
analyzing and dividing at least one orthographic multisyllable word of the plurality of orthographic multisyllable words into two or more syllables by examining the at least one orthographic multisyllable word; and
causing an electronic display to display a screen created by the software, the screen including a modified version of the text that adds emphasis to a first syllable of the two or more syllables by using an emphasized font, while leaving a second syllable of the two or more syllables in an original non-emphasized font, wherein spacing between letters of the plurality of orthographic multisyllable words in the modified version is in accord with a standard typography, wherein the two or more syllables in the at least one orthographic multisyllable word include sequential syllables of the at least one orthographic multisyllable word, the sequential syllables being emphasized by alternating plain font with bolded font; and
graphically distinguishing, in the modified version of the text, an orthographic long vowel from an orthographic short vowel.

6. The computerized method of claim 5, wherein the graphically distinguishing the orthographic long vowel from the orthographic short vowel includes underscoring the orthographic long vowel, while not underscoring the orthographic short vowel.

7. The computerized method of claim 6, wherein the emphasized font is a bolded font, and the original non-emphasized font is not bolded.

8. The computerized method of claim 5, wherein the orthographic multisyllable words of the modified version and the orthographic multisyllable words of the text correspond to words of a Latin-derived language and/or an English-derived language, and wherein the emphasized font is bolded and is a first font theme and the original non-emphasized font is not bolded and is a second font theme that is different than the first font theme, wherein the two or more syllables in the at least one orthographic multisyllable word include sequential syllables of the at least one orthographic multisyllable word, the sequential syllables being emphasized by alternating plain font with bolded font.

* * * * *